(12) United States Patent
Axelsson

(10) Patent No.: US 7,829,007 B2
(45) Date of Patent: Nov. 9, 2010

(54) INJECTION-MOULDING SYSTEM

(75) Inventor: Robert Axelsson, Gränna (SE)

(73) Assignee: Etervind AB, Sollentuna (SE)

( * ) Notice: Subject to any disclaimer, the term of this patent is extended or adjusted under 35 U.S.C. 154(b) by 22 days.

(21) Appl. No.: 12/375,637

(22) PCT Filed: Aug. 3, 2007

(86) PCT No.: PCT/EP2007/058070
§ 371 (c)(1),
(2), (4) Date: Jan. 29, 2009

(87) PCT Pub. No.: WO2008/015274
PCT Pub. Date: Feb. 7, 2008

(65) Prior Publication Data
US 2010/0001436 A1     Jan. 7, 2010

(30) Foreign Application Priority Data
Aug. 4, 2006   (EP)   ................... 06118436

(51) Int. Cl.
    B29C 45/64   (2006.01)
(52) U.S. Cl. .............. 264/328.1; 425/190; 425/195
(58) Field of Classification Search .......... 264/328.1, 264/328.16; 425/190, 195, 182, 192 R
    See application file for complete search history.

(56) References Cited

U.S. PATENT DOCUMENTS

| | | | | | |
|---|---|---|---|---|---|
| 2,526,993 | A | * | 10/1950 | Bower | ............... 425/447 |
| 4,009,979 | A | * | 3/1977 | Martin | ............... 425/107 |
| 4,174,199 | A | * | 11/1979 | Benninghaus | ........... 425/195 |
| 4,500,275 | A | | 2/1985 | Ruhl | ............... 425/192 R |
| 4,776,783 | A | * | 10/1988 | Pelle et al. | ........... 425/190 |
| 5,562,935 | A | | 10/1996 | Martin | ............... 425/552 |
| 6,036,469 | A | * | 3/2000 | Allen et al. | ........... 425/192 R |
| 2004/0001901 | A1 | | 1/2004 | Towery et al. | ........... 425/190 |

FOREIGN PATENT DOCUMENTS

| | | |
|---|---|---|
| EP | 555 976 A1 | 8/1993 |
| GB | 2 274 424 A | 7/1994 |
| JP | 56-155731 A | 12/1981 |
| JP | 57-160621 A | 10/1982 |
| JP | 60-68913 A | 4/1985 |
| JP | 2003-337370 A | 11/2003 |
| JP | 2004-202566 A | 7/2004 |
| JP | 2005-186146 A | 7/2005 |

* cited by examiner

OTHER PUBLICATIONS

International Search Report PCT/EP2007/058070 Dated Dec. 17, 2007.

*Primary Examiner*—Jill L Heitbrink
(74) *Attorney, Agent, or Firm*—Winston & Strawn LLP

(57) ABSTRACT

An injection-moulding system for an injection-moulding machine including a clamping assembly, a temperature-adjusting system, and an ejector. The clamping assembly comprises two horizontal beams for mounting on the platens of the injection-moulding machine and two vertical beams for crosswise mounting on the horizontal beams in multiple positions. The clamping assembly allows dies of various sizes to be clamped in one and the same machine. The temperature-adjusting system includes at least one cooling tube for detachable insertion into a blind hole formed in the die. The cooling tube is attached to coolant conduits which are permanently attached to a source of coolant. Dies can thereby be replaced quickly and easily without spilling any coolant. The ejector is adapted to eject the cooled product after opening of the die. The injector pins are in an inexpensive way glued to the ejector plate. Use of the injection-moulding system provides considerable cost savings over conventional devices.

23 Claims, 9 Drawing Sheets

INJECTION-MOULDING SYSTEM

This application is a 371 filing of International Patent Application PCT/EP2007/058070 filed Aug. 3, 2007.

BACKGROUND

The invention relates to a clamping assembly mounted on one of opposed stationary and movable platens of an injection-moulding machine for clamping a die half of a die for injection-moulding a product, and of that kind which is arranged to be adjusted to receive die halves of various sizes.

The material to be moulded is typically a thermoplastic plastic, which in a heated liquefied or plasticized state, is injected into the die. The die halves of the die are clamped upon their respective opposite platens of the injection-moulding machine to be used. One of the platens is stationary while the other one is movable between a position, in which the die is closed and a position, in which the die is open. The die is, during operation, cooled for bringing the hot injected plastic into its solid state. The die is then opened and the product ejected.

A specific injection-moulding machine in an injection-moulding plant is frequently used for dies of various sizes. The dies must however, irrespective of their size, fit to the platen of such a machine. This fact implies that some dies need to have an unnecessarily large size in proportion to the size of the product to be moulded, thereby causing extra costs for producing the dies.

Over the years attempts have been made to overcome this problem.

A frame for clamping dies for moulding more products at the same time is for example known from the patent publication U.S. No. 2004/0001901 A1. In this case a die is built up of more parts which are arranged in a module system and together fit the frame. The frame is not adjustable and cost saving is only possible for products in such module system.

The U.S. Pat. No. 4,500,275 describes a flexible clamping assembly for clamping dies of various sizes by means of retainer clamps and screw devices for screwing the retainer clamps into intended positions in relation to the platen of the injection moulding machine used. The clamping device is however difficult and time-consuming to adjust. The mounted die can moreover not be securely and exactly retained and positioned. To this may be added that it is only possible within narrow limits to adjust this known clamping assembly.

Japanese Patent Application No. JP 56 155731 is concerned with relocating of die-assemblies by using a die-transferring truck. Each die half is mounted on a fitting plate which in turn is clamped onto a corresponding fixing plate.

Japanese Patent Application No. JP 2005 186146 discloses a die-fastening device comprising a frame-shaped jig which is attached to a platen. Onto the frame-shaped jig are mounted two die base supporting blocks that feature hackers and pins for fastening the a die.

UK Patent Application No. GB 2 274 424 discloses a device for tool changing, the device comprising guide means and a stop which are used for correctly positioning a backplate attached to a die half onto a platen. The device further features clamp members that are mounted on carriers, which in turn are fastened to the platen. A die half may be introduced by fastening it to a backplate, guiding said backplate through the guiding means and fastening the backplate to the platen by using the clamping members.

Japanese Patent Application No. JP 2003 071898 provides a cooling structure for a mold comprising a cylindrical cooling tube and conduits for supplying coolant to the cooling tube.

European Patent Application No. EP 0 555 976 discloses a metal mold cooling device comprising a cooling hole into which a cooling pipe may be inserted which is capable of cooling liquid transfer into the cooling hole. The cooling liquid may be discharged through a discharge pipe.

The devices of these references all suffer from deficiencies such that a need exists for improved devices.

SUMMARY OF THE INVENTION

The above-mentioned disadvantages of the prior art clamping assemblies are according to the present invention remedied by, in a first aspect of the invention providing a clamping assembly of the kind mentioned in the opening paragraph which quickly and easily can be adjusted to receive die halves of different sizes, in a second aspect of the invention providing a clamping assembly of the kind mentioned in the opening paragraph by means of which a die half can be positioned exactly in relation to the platen of the injection-moulding machine to be used, in a third aspect of the invention providing a clamping assembly of the kind mentioned in the opening paragraph which is adapted to securely keep the die half in correct position during operation, in a fourth aspect of the invention providing a clamping assembly of the kind mentioned in the opening paragraph which is adapted to be adjusted within a large range, in a fifth aspect of the invention providing a clamping assembly of the kind mentioned in the opening paragraph which comprises a number of long elements having different length.

The novel and unique features of the invention consist in the fact that the clamping assembly comprises first bar-shaped elements mounted on or integrated with the platen in question, second bar-shaped elements mounted on the first elements crosswise to these elements, and clamping means for detachably clamping the second bar-shaped elements on the first bar-shaped elements in at least two positions.

By means of this construction it is advantageously obtained that the clamping assembly can be adjusted within a large range and allow dies of different sizes to be mounted on one and the same injection-moulding machine, thereby saving considerable costs because it is not necessary to produce costly large die halves fitting the platen of the injection-moulding machine for injection-moulding smaller products. The clamping assembly allows inexpensive compact dies to be used instead.

The first- and second elements, which are extending crosswise to each other, can within the scope of the invention extend in any direction on the respective platen. The first elements are however, in an expedient embodiment according to the invention, extending into a horizontal direction and the second elements into a vertical direction whereby it is advantageously obtained that the second elements easily can be displaced on the first elements when adjusting the clamping assembly.

The mutual clamping and positioning of the two sets of bar-shaped element can in itself be carried out in any suitable way but can, in an advantageous embodiment according to the invention, be performed by providing the second elements with a number of through holes and the first elements with a number of threaded holes arranged in such way that the through holes are positioned opposite each their threaded hole when the second elements are positioned in one of their at least two positions on the first elements, whereby screws or stud screws can be passed through the through holes and screwed into the opposite threaded holes for clamping the second elements on the first elements.

A repeating accuracy of the injection-moulded products requires the die halves to be positioned exactly in relation to each other each time the die is closed during operation. This is usually obtained by means of leader pins on one of the die halves and corresponding leader bushes on the other one. Clamping the die halves on their associated platens in positions where the leader bushes are introduced in the leader bushes then determine the correct position of each die half in relation to the associated platen.

For positioning the die half on the second elements, each of the leader pins or leader bushes can, according to the invention, moreover have an extension in form of a tight-fitting pin fitting into a tight-fitting hole in the second elements.

A clearance can, according to the invention, moreover be formed between each of the above mentioned through holes in the second elements and the associated screw. Said clearance implies that the screws do not constitute an obstacle against displacing the second elements on the first elements to positions in which each die half is in the position determined by the leader pins and leader bushes.

The clamping of the die half on the second elements can, according to the invention, be performed by means of screws passed through through holes in the die half and screwed into threaded holes in connection pieces which each has a hook slidingly engaging a longitudinally extending groove formed in a second element.

According to the invention a clearance can be formed between each through hole in the die half and the associated screw and also between the hook of the connection piece and the associated longitudinally extending groove. Said clearances imply that the screws and the connection pieces do not constitute an obstacle against displacing the die half on the second elements to the position determined by the leader pins and leader bushes.

The clamping of the die halves on the second elements by means of connections pieces also advantageously implies that some areas can be kept free on the second elements for mounting of other components, e.g. core retraction assemblies.

The second elements are displaced crosswise to the first elements when adjusting the clamping assembly to receive smaller or larger dies.

Such displacements are facilitated when the first elements are equipped with longitudinally extending guide rails and the second elements are equipped with slides fitting to the guide rails.

According to the invention the clamping assembly is arranged in such way that the second elements are bearing on the platen in their clamped state for thereby relieving the elements of some of the load acting on them during operation.

The slides can, according to the invention, furthermore fit to the corresponding guide rail with a clearance. Said clearance is advantageously allowing the second elements to be free of the platen during crosswise displacement on the first elements so that said displacement can be performed without friction between the elements and the platen.

The clamping assembly can, according to the invention, moreover comprise a number of first elements of different lengths and/or a number of second elements of different lengths, whereby it is obtained that the clamping assembly can fit injection-moulding machines of different sizes.

Some products have a shape that requires one or more cores inserted into the die during the injection moulding operation.

Such a core can, according to the invention, be withdrawn by means of a core retraction assembly which comprises a guideway detachably clamped on one of the bar-shaped elements, a core slide slideably mounted on the guideway and a core bar mounted on the core slide.

The core slide can be moved from a position, in which the core is inserted into the die and another position, in which the core is retracted from the die by means of e.g. a pneumatic or hydraulic cylinder.

More of such core retraction assemblies can, according to the invention, be mounted on the clamping assembly and on both the first- and the second elements of this.

According to the invention the core bar can have a head for being mounted detachably on the core retraction assembly and the core can be permanently attached to the core bar. The core, core bar and bar head thus form a core unit which, on replacement of dies, appropriately can be replaced with another core unit while the core retraction assembly is still mounted on the associated element. The time used for replacing dies with cores is thereby drastically reduced.

The head of the unit can e.g. have a T-form which fits into a T-slot in the core retraction assembly.

The invention also relates to a temperature-adjusting system for adjusting the temperature of a die half clamped on opposed stationary and movable platens of an injection-moulding machine, and of that kind that comprises a source of coolant and at least one cooling channel formed in the die half.

The material to be moulded is typically a thermoplastic plastic which during operation is injected into the die in a heated liquefied or plasticized state. The die must be cooled in order to bring the hot plastic in the die into such a solid state that the moulded product can be ejected after opening the die.

The prior art cooling channels are typically connected to the source of liquid by means of e.g. screw joints which have to be disconnected when removing a die from the platen of the injection-moulding machine in use and reconnected when mounting a new die in the machine. These operations take time, during which the costly injection-moulding machine is out of operation thereby causing considerable expenses to the plant using the injection-moulding machine.

Another problem consists in the fact that said disconnection and reconnecting operations are difficult to carry out owing to the normally limited space available around dies mounted in an injection-moulding machine.

When disconnecting the die from the source of liquid some liquid will also unavoidably be spilled with the risk that the die and the injection-moulding machine might be corroded by the liquid which frequently is water.

In an attempt to solve the above-mentioned problems of the prior art temperature-adjusting systems, U.S. Pat. No. 5,562,935 discloses an improved system for connecting and disconnecting the connections between the source of liquid and the liquid channels of a die mounted in an injection-moulding machine.

This system comprises an adapter frame mounted on the face of each platen of the machine, each adapter frame having a U-shaped guide and a support plate for supporting a die half for slideably engaging the channel. A coolant hookup manifold including first connectors is mounted on the adapter frame, and a second coolant hookup including second connectors is mounted on the support plate.

The first and second connectors are configured to automatically engage each other in a sealed way when the support plate and the die core slide into engagement with the adapter frame whereby the time for connecting and disconnecting a die from a source of liquid can be reduced.

This known temperature-adjusting system is however very complicated and costly and there is still a risk of spilling liquid, e.g. water, during the connecting and disconnecting operations owing to the fact that the connections are open some of the time during the carrying-out of these operations.

The above-mentioned disadvantages of the prior art temperature adjusting system are according to the present invention remedied by, in a first aspect of the invention providing a temperature-adjusting system of the kind mentioned in the opening paragraph in which the liquid is circulated in a closed circuit during operation.

in a second aspect of the invention providing a temperature-adjusting system of the kind mentioned in the opening paragraph which can be connected and disconnected easier and more quickly than hitherto known, in a third aspect of the invention providing a temperature-adjusting system of the kind mentioned in the opening paragraph which can be connected and disconnected without any risk of spilling liquid on the die and/or on the injection-moulding machine being used, in a fourth aspect of the invention providing a temperature adjusting system of the kind mentioned in the opening paragraph which has a simple and inexpensive construction.

The novel and unique features of the invention consist in the fact that the temperature-adjusting system comprises at least one closed tube adapted to be detachably introduced into the cooling channel and permanently connected with said source of coolant by means of a first conduit extending a little into the closed tube and a second conduit extending far into the closed tube.

The risk of spilling liquid on connecting and disconnecting the connections between the source of coolant and the cooling channels of conventional temperature-adjusting systems is thereby advantageously avoided and said operations can moreover be carried out in an easy and quick way.

The closed tubes need, on replacement of a die, to be removed from the cooling channels in the old die half and introduced again in the cooling channels in the new die half.

To facilitate these operations the temperature-adjusting system can, according to the invention, comprise a sleeve which is permanently mounted in the entrance of the at least one cooling channel and which on the outer side has at least one seal for sealing the sleeve in relation to the wall of the at least one cooling channel and on the inner side has at least one other seal for sealing the sleeve in relation to the at least one closed tube when this has been passed into the at least one cooling channel through the opening of the sleeve.

When the cooling channel is a blind hole, a liquid like e.g. oil, according to the invention can be provided in the space between the wall of the blind hole and a closed tube introduced in the blind hole. Thereby an effective exchange of heat between the tube and the wall of the cooling channels is secured, especially when the tube is made of a good thermal conductor as for example metal.

The invention also relates to an ejector comprising an ejector plate and one or more ejector pins attached to the ejector plate for ejecting a product which has been injection-moulded in a die clamped in an injection-moulding machine.

The material to be moulded is typically thermoplastic plastic, which in a heated state is injected into the die. The die is, during operation, cooled for thereby bringing the hot plastic in the die into such a solid state that the product can be ejected when opening the die.

The ejector pins of known ejectors are mechanically attached to the ejector plate, e.g. by being undercut mounted in the ejector plate. Such operations are however time consuming and costly, especially because the positioning of the pins must fit exactly to the pattern of the ejector holes in the die half.

The above-mentioned disadvantages of the prior art ejectors are according to the present invention remedied by, in a first aspect of the invention providing an ejector of the kind mentioned in the opening paragraph by means of which the ejector can be produced quickly and easily, in a second aspect of the invention providing an ejector of the kind mentioned in the opening paragraph by means of which the ejector can be produced in a cost-saving way, in a third aspect of the invention providing an ejector of the kind mentioned in the opening paragraph which quickly and easily can be adjusted to fit the pattern of the ejector holes in a given die half, in a fourth aspect of the invention providing an ejector of the kind mentioned in the opening paragraph which is adapted to securely keeping the ejector pins in correct positions in the ejector holes of the die during operation.

The novel and unique features of the invention consist in the fact that the ejector pins can be attached to the ejector plate by means of an adhesive which, in a preferred embodiment, can comprise two components. This means that the ejector plate and the ejector pins are glued together by means of said adhesive whereby an inexpensive ejector is obtained, which can be produced quickly and precisely.

The invention also relates to a method for producing an injection-moulded product in a die mounted in an injection-moulding machine by using a clamping assembly for clamping the die on the platen of the injection-moulding machine, a temperature-adjusting system for during operation regulating the temperature of the die to a temperature proper for the injection-moulding process, and an ejector for ejecting the moulded product.

The novel and unique features of the invention consist in the fact that the clamping assembly is adjusted so that it is capable of receiving the specific die to be used, that the die is clamped on the adjusted clamping assembly, that the material used for moulding the product is injection-moulded in heated state into the die, that the die and thereby the heated material in the die is cooled by means of the temperature-adjusting system, and that the product is ejected by means of the ejector.

By means of this method an inexpensive and precisely moulded product is advantageously obtained.

The invention also relates to an injection-moulding system for an injection-moulding machine, comprising a clamping assembly, a temperature-adjusting system, and an ejector, whereby the clamping assembly can be the clamping assembly according to the above stated invention, the temperature-adjusting system can be the temperature-adjusting system according to the above stated invention, and the ejector can be the ejector according to the above stated invention.

The injection-moulding system of the invention presents an economical and a quick way of producing products of variable sizes in one and the same machine.

The injection-moulding system of the invention can advantageously be used for quickly, easily and precisely injection moulding an inexpensive product of e.g. plastic.

BRIEF DESCRIPTION OF THE DRAWINGS

The invention will be explained in greater detail below, giving further advantageous features and technical effects and describing exemplary embodiments with reference to the drawing, in which.

DETAILED DESCRIPTION OF THE PREFERRED EMBODIMENTS

The material to be used for injecting into a die clamped in an injection-moulding machine may be of any suitable kind but in the following description it is assumed that the material is a plastic.

Figure 1:
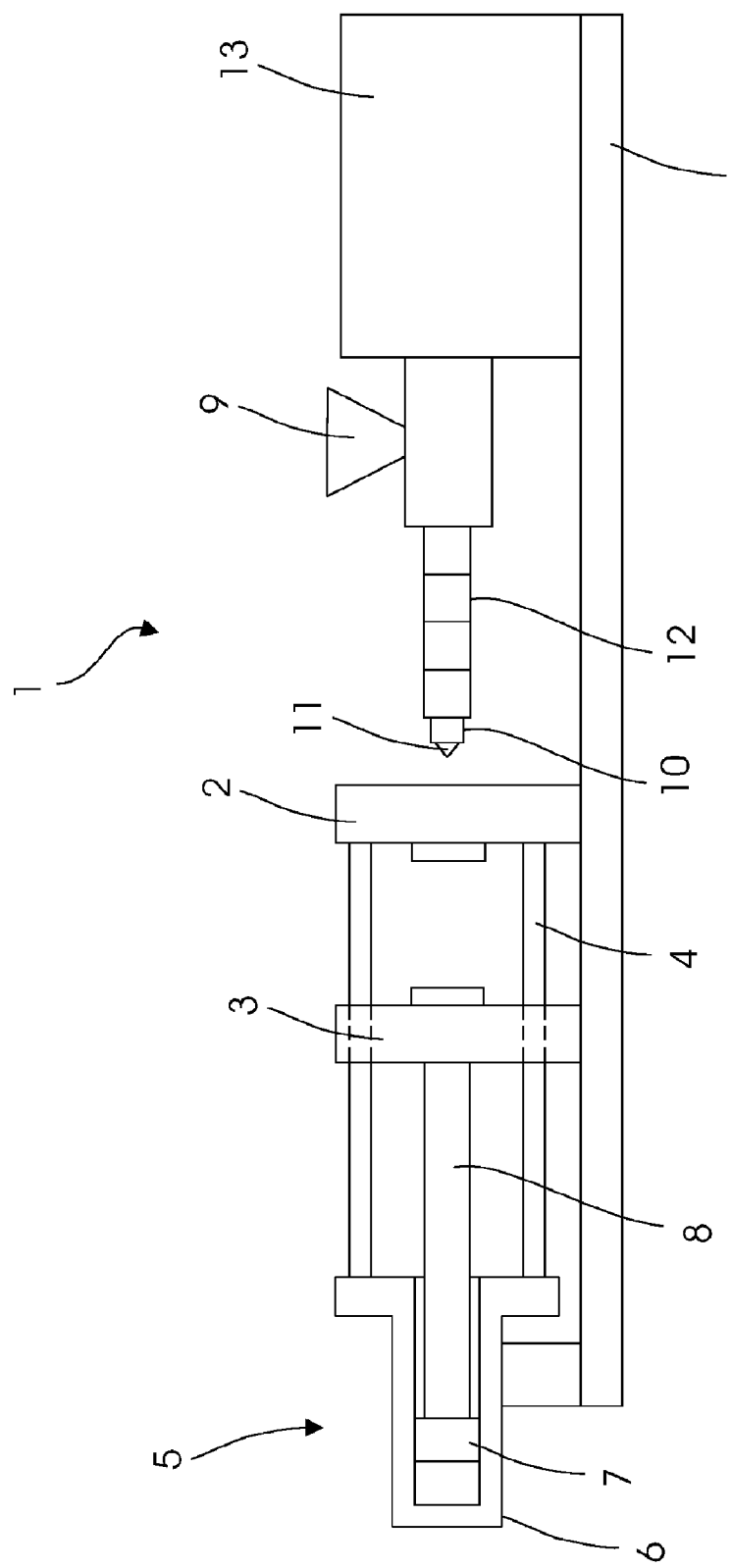
FIG. 1 is a diagrammatic side elevational view of a known injection-moulding machine with a stationary and a movable platen for clamping two die halves of a die.

FIG. 1 shows very schematically the fundamental construction of an injection-moulding machine 1, which comprises a stationary platen 2 and a movable platen 3 slidingly mounted on four bars 4 of which only two bars can be seen in the figure.

Actuating means 5 is provided for sliding the movable platen on the bars toward and away from the stationary platen. The actuating means is in this case a hydraulic cylinder 6 with a piston 7 and a piston rod 8.

A hopper 9 is adapted to receive solid plastic (not seen), which is preferably supplied in granulated form. During operation the plastic granulate is fed into an injector 10 for injecting the plastic into a closed die (not seen in the figure) through a nozzle 11. The injector may e.g. be a screw or ram injector surrounded by a heating means 12, such as an electrical heating coil for plasticizing the plastic prior to injection.

Various equipment, e.g. controlling implements (not shown) of the injection-moulding machine, is contained in a schematically shown housing 13. The machine is resting on e.g. a floor (not shown) by means of a base frame 14.

Figure 2:
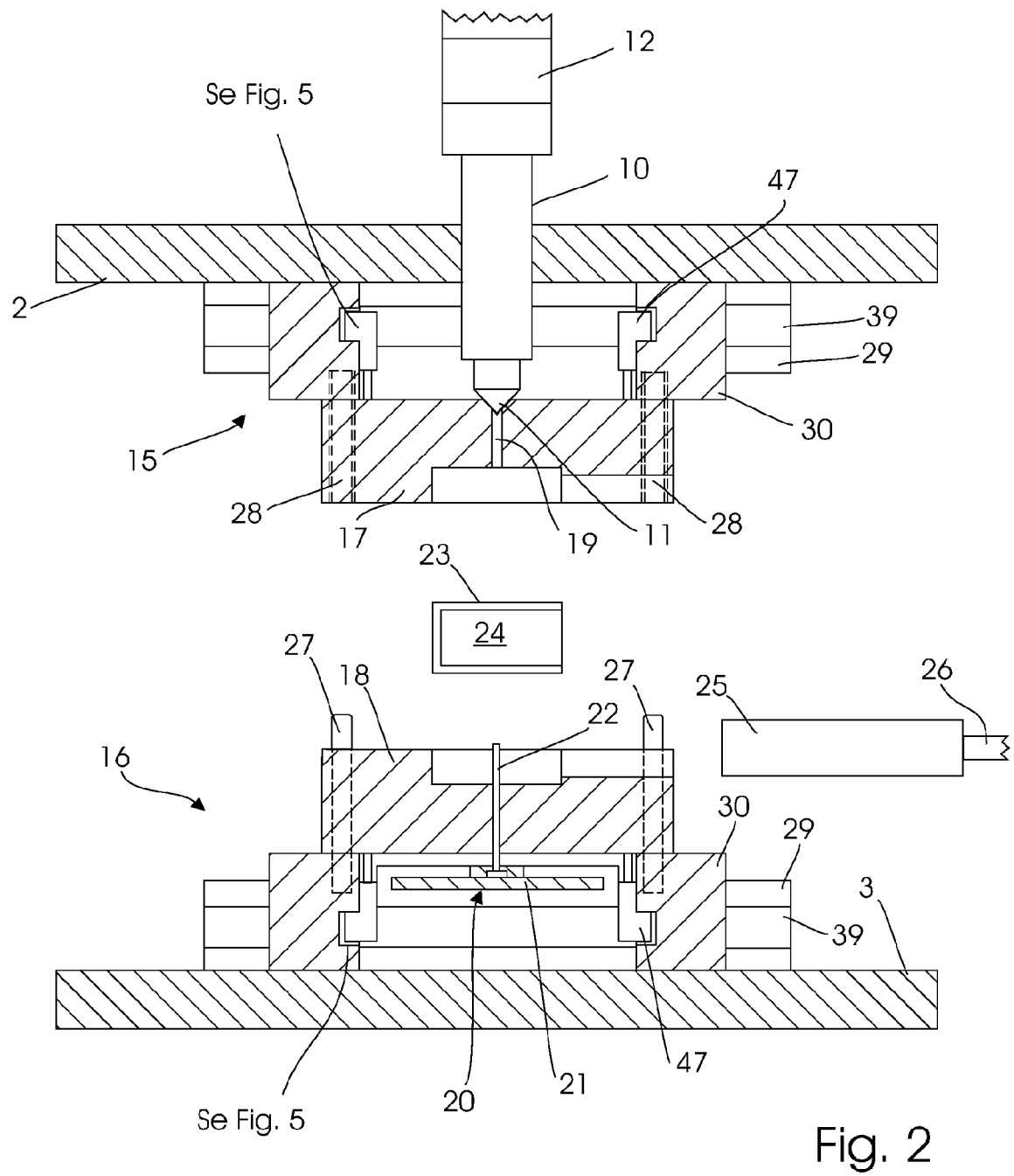
FIG. 2 is a cross-sectional view of two clamping assemblies mounted on respective platens and two die halves clamped on respective clamping assemblies.

A clamping assembly 15 is, as seen in FIG. 2, mounted on the stationary platen 2 of the injection-moulding machine 1 (not shown in the figure), and another similar clamping assembly 16 is mounted on the movable platen 3.

A fixed die half 17 is clamped on the clamping assembly 15 on the stationary platen 2, while a movable die half 18 is clamped on the clamping assembly 16 on the movable platen 3.

The die 17,18 is open in FIG. 2. However, moving the movable platen 3 towards the stationary platen 2 by means of the actuating means 5 (not shown in FIG. 2) closes the die 17,18.

Hot plasticized plastic is, during operation by means of the injector 10 (not seen in FIG. 2), injected into the closed die 17,18 via the nozzle 11 and an inlet channel 19 formed in the stationary die half 17.

The die is cooled in a way, which will be described in more details later on. The hot plasticized plastic is, by cooling the die, cooled down to a temperature at which the plastic is solid and therefore can be ejected.

The ejecting of the moulded product 23 takes place, after opening the die, by means of an ejector 20 comprising an ejector plate 21 and in this case only one ejector pin 22. More ejector pins may be used in other applications.

The ejected product is, in this case, shaped like a cap 23. Inserting a core 25 into the closed die forms the opening 24 of the cap 23 as the core 25 is keeping a space conformed to the opening clear of plastic during the moulding process.

The core 25 is attached to a core bar 26 of a core retraction assembly having a construction, which will be described in more details later on. The core has, in FIG. 2, been retracted from the die.

The above-described injection-moulding process is generally used for batch production or mass production of a number of products which are required to be exactly identical.

It therefore is important that the two die halves 17,18 are closed in exactly the same mutual position for each injection-moulding operation.

The exact positioning of the die halves in relation to each other is ensured by means of leader pins 27 in the die half 18 for engaging corresponding leader bushings 28 in the die half 17.

Figure 3:
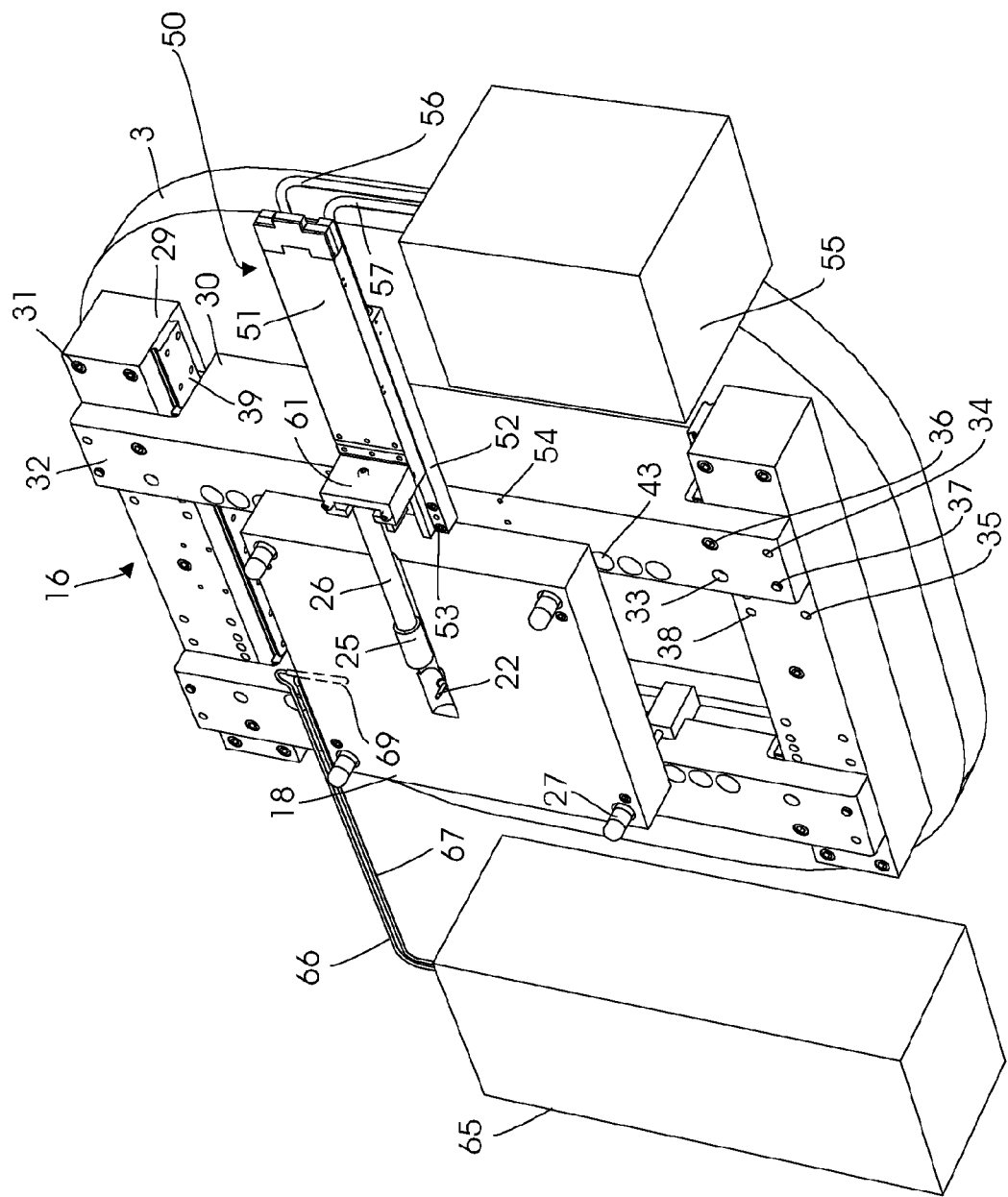
FIG. 3 is a perspective view of an injection-moulding system for an injection-moulding machine with one of the clamping assemblies shown in FIG. 2 mounted on the associated platen.

FIG. 3 shows the clamping assembly 16 clamped on the platen 3 of the injection moulding machine 1 (not shown). The clamping assembly 16 is substantially identical to the clamping assembly 15. For like parts the same reference numerals are therefore used.

FIGS. 2 and 3 show that the clamping assemblies 15 and 16 each comprise two horizontal beams 29 clamped on the platen 2 and 3, respectively, and two vertical beams 30 clamped on the horizontal beams 29 and also that the die halves 17 and 18 are clamped on the vertical beams 30.

The term "beam" means in the sense of the invention a bar-shaped element.

The beams 29 and 30 are adapted in such way that the two vertical beams 30 can be clamped on the two horizontal beams 29 in a number of different positions and the vertical beams 30 are moreover adapted to mount die halves of various sizes.

These facts mean that a given injection moulding machine can be used for clamping dies of a number of different sizes.

The ability to clamp dies of different sizes on the platens of one and the same injection-moulding machine advantageously implies that considerable costs can be saved since the clamping assembly can be adjusted to receive die halves of sizes reduced to the absolutely necessary. Inexpensive compact dies can thereby be used.

The existing injection-moulding machine and its platen vary however within an extensive range of sizes. To be able to fit to platens which are available in sizes from very small platens to very large platens, the clamping assemblies 15,16 are each divided into a plurality of sets, in which each set has beams of a length that differ from the length of the beams of other sets.

The clamping assemblies 15,16 are in this way adapted to cover the whole range of platen sizes. The number of sets of beams and the length of the beams in each set determine how close the clamping assemblies are able to fit to the different platens.

In FIG. 3 the horizontal beams 29 are clamped on the platen 3 by means of screws 31. The horizontal beams may alternatively be integral with the platen.

FIG. 3 also shows that each vertical beam 30 is formed with opposite clamping parts 32, which are overlapping their respective horizontal beam 29. Each of the clamping parts 32 is thinner than the rest of the vertical beam 30.

Each of the clamping parts 32 of the vertical beams 30 is positioned on a horizontal beam 29 by means of, in this case, two tight-fitting pins 33 fitting into corresponding tight-fitting holes 34 and 35 in the clamping part 32 and the horizontal beams 29, respectively, whereby an exact positioning of the vertical beams on the horizontal beams is obtained.

The horizontal beams 29 are formed with a number of such tight-fitting holes 35 whereby a number of positions for the vertical beams on the horizontal beams are defined.

Each of the clamping parts 32 of the vertical beams 30 is clamped on a horizontal beam 29 by means of, in this case, two screws 36 fitting into corresponding through holes 37 in the vertical beams 30 and into corresponding threaded holes 38 in the horizontal beams, thereby securely retaining the vertical beams to the horizontal beams.

The horizontal beam 29 is formed with a number of such threaded holes 38. The vertical beams can simultaneously be positioned and clamped on the horizontal beams in a number of different positions because the pattern, which the two tight-fitting holes 35 and the two threaded holes 38 forms, is repeated a number of times along the horizontal beam 29.

The positioning of the die halves in relation to each other takes, as mentioned above, place by means of the leader pins 27 in the die half 18 engaging the leader bushings 28 in the die half 17.

The leader pins 27 and the leader bushes 28 thus determine the position of the vertical beams in relation to the horizontal beams when mounting the die half on the vertical beams.

Positioning the vertical beams in relation to the horizontal beams also by means of the tight fitting pins 33 in the tight fitting holes 34 and 35 in the vertical- and horizontal beams 30 and 29 therefore require the clamping assembly to be produced with very tight tolerances.

Figure 4:
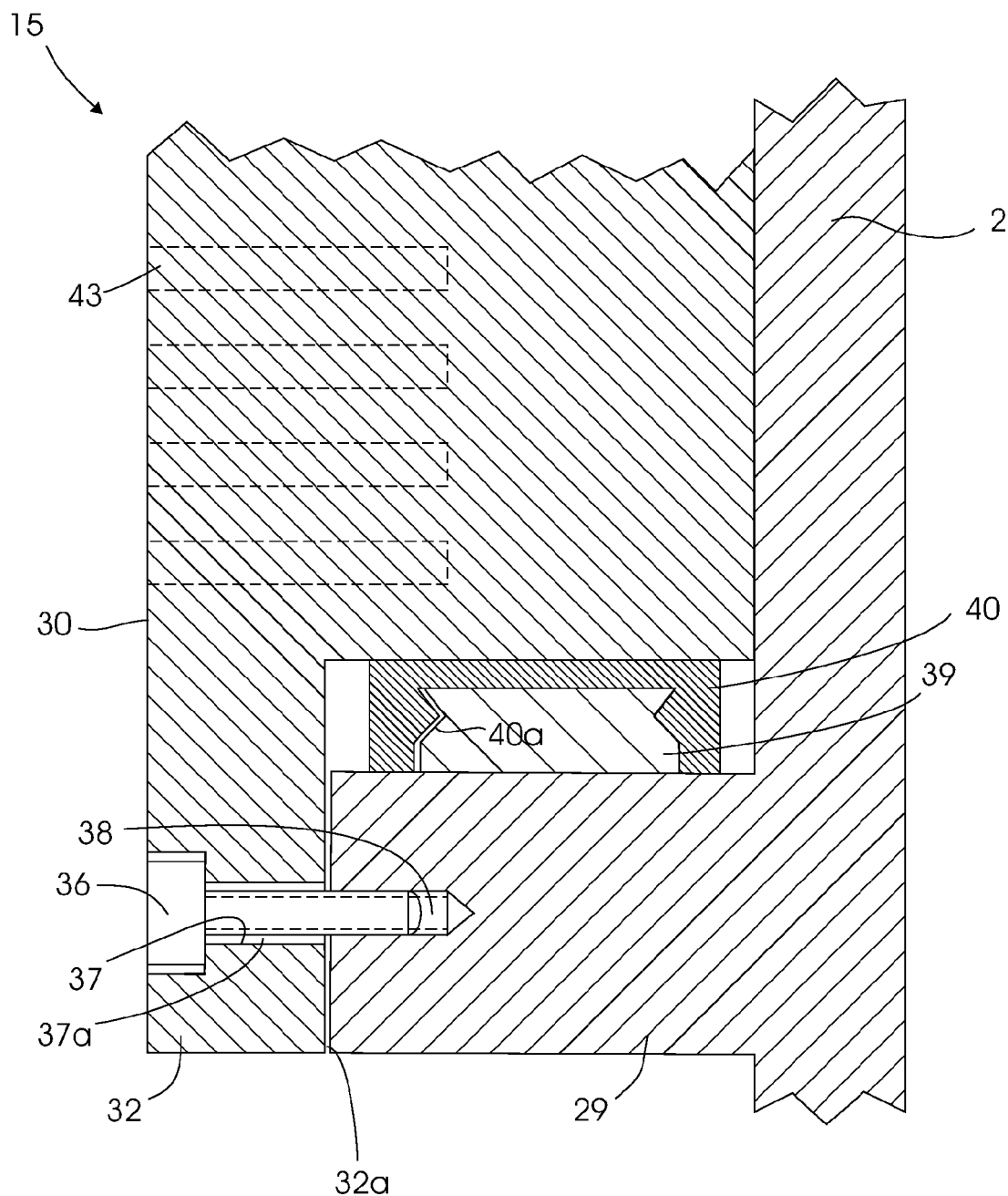
FIG. 4 is on a larger scale a fractional view of the clamping assembly shown in FIG. 3 in a clamped state.
Figure 5:
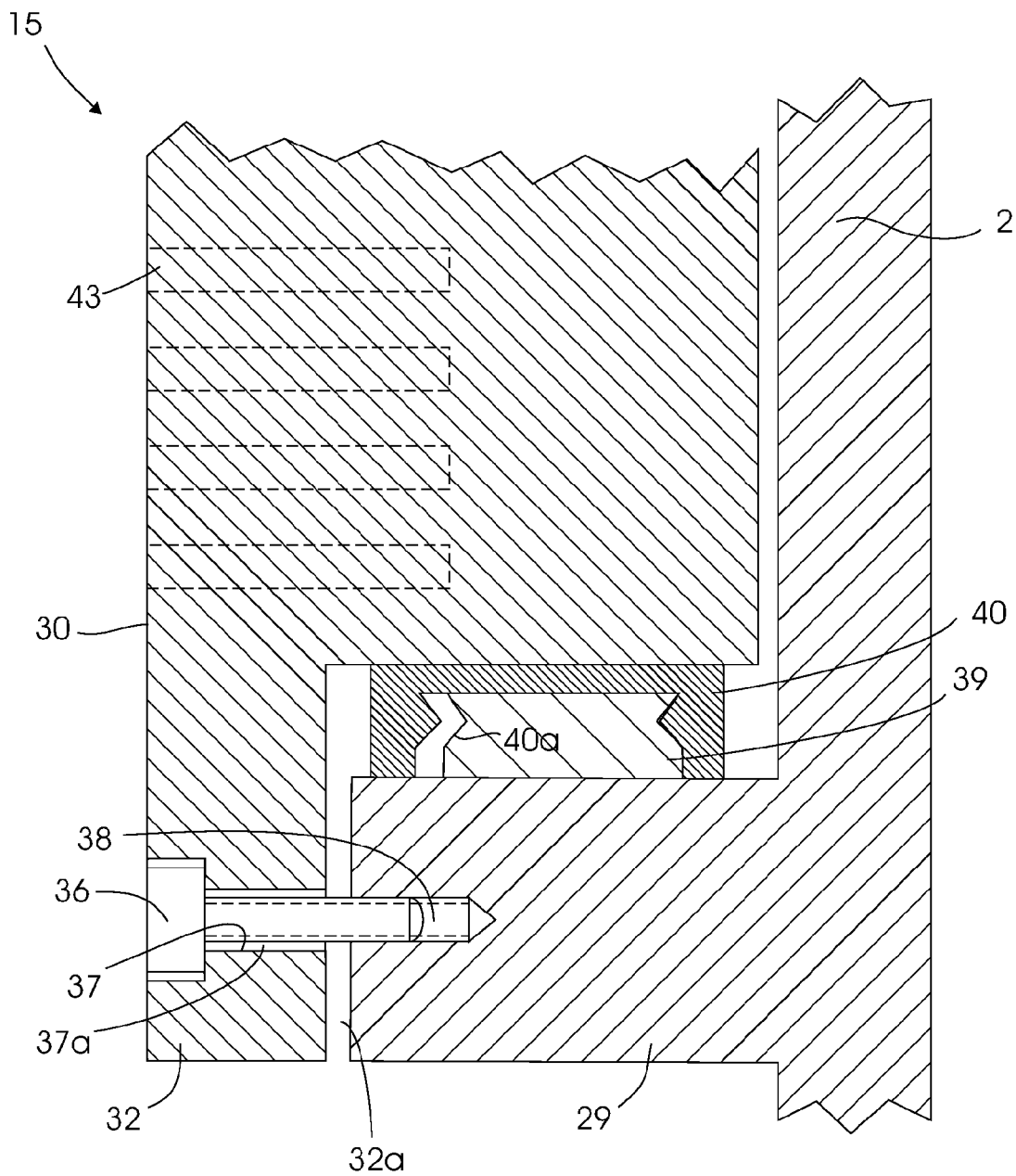
FIG. 5 shows the same as in FIG. 4 but with the clamping assembly in a non-clamped state.

The positioning of the vertical bars on the horizontal bars therefore takes place, as shown in FIGS. 4 and 5, preferably without the tight-fitting pins 33 fitting into the corresponding tight-fitting holes 34 and 35 in the clamping part 32 and the horizontal beams 29, respectively.

FIGS. 4 and 5 shows a cross section of a fragment of the clamping assembly 15 mounted on the platen 2. The horizontal beam 29 constitutes in this case an integrated part of the platen 2. The clamping assembly 16 is mounted on the platen 3 in the same way (not shown). Only the screws 36 fitting into corresponding through holes 37 in the vertical beams 30 and into corresponding threaded holes 38 in the horizontal beams 29 are in this case used for mounting the vertical beams on the horizontal beams. In FIGS. 4 and 5 only one of these screws 36 is seen.

A clearance 37a is formed between each of the through holes 37 and the associated screw 36. Said clearance 37a implies that the screws 36 do not constitute an obstacle against displacing the vertical beams 30 on the horizontal beams 29 to positions in which each die half is in the position determined by the leader pins 27 and leader bushes 28 (not shown in FIGS. 4 and 5.)

Each of the horizontal beams 29 is equipped with guide rails 39 which in this case each is formed like a dovetail, and each of the vertical beams 30 is equipped with at least two slides 40 which are slidingly mounted on the guide rail.

This arrangement makes it advantageously easy for the operator to displace the vertical beams 30 on the horizontal beams 29 when required by replacements of dies.

In FIG. 4 the central part between the clamping parts 32 of each of the vertical beams 30 is supported by the platen 2 whereby it is obtained that the load on the vertical beams 30 can be increased. A clearance 32a between the clamping parts 32 and the horizontal beam 29 ensures that it only is said central part which will be supported by the platen.

Another clearance 40a is formed between each slide 40 and the associated rail 39. This clearance 40a allows the vertical beams to be displaced somewhat crosswise to the platen, as can be seen in FIG. 5, whereby displacements of the vertical beams along the horizontal beams by replacing die halves can take place without any friction at all between the vertical beams and the platen and therefore with a minimum of effort.

Figure 6:
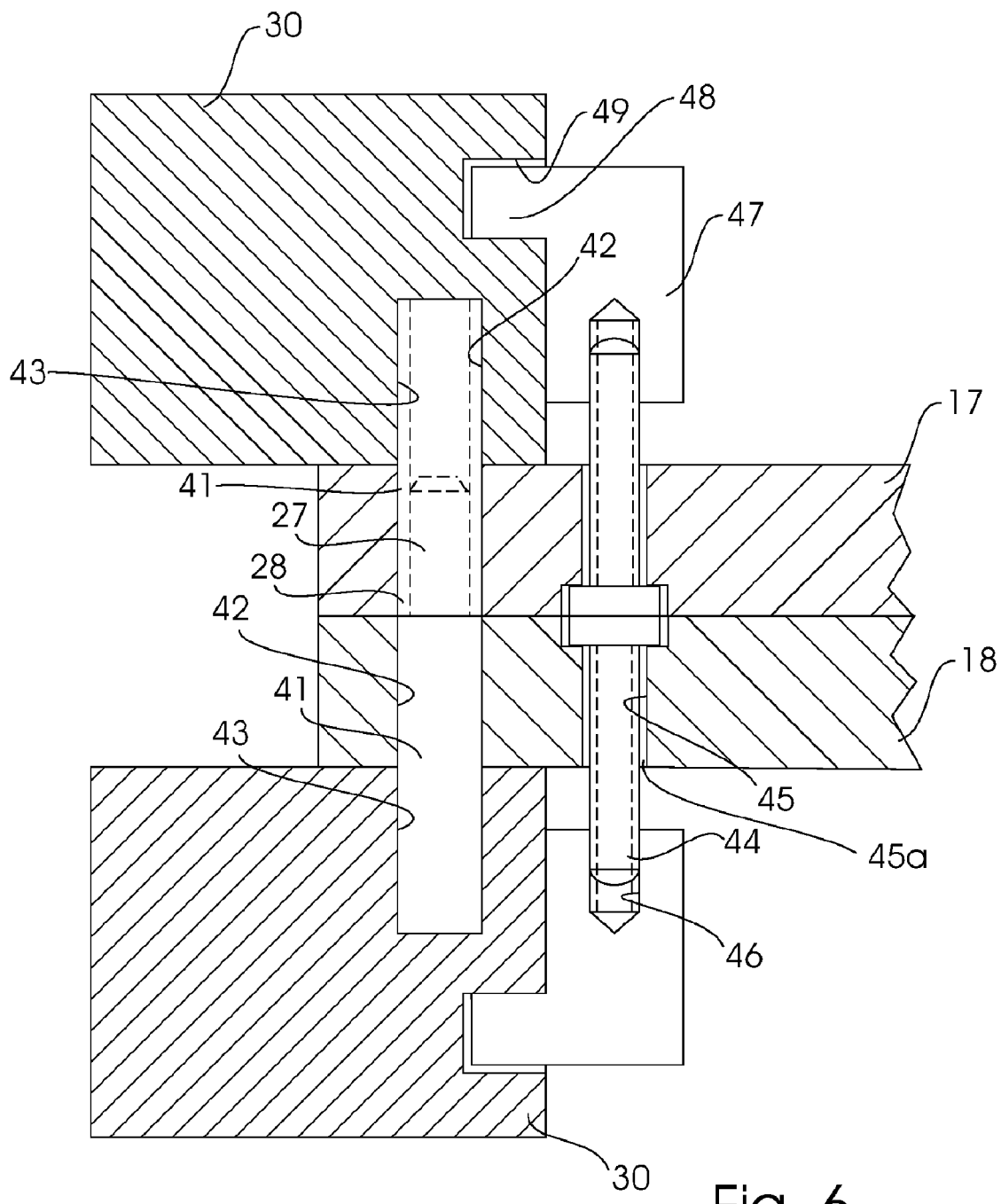
FIG. 6 is on a larger scale a fractional view of the die halves in the closed position of the die and the die halves clamped on respective clamping assemblies.

FIG. 6 is a fractional, sectional view of the die 17,18 in its closed state. The die halves are positioned on the vertical beams 30 by means of tight-fitting pins 41 fitting into corresponding tight-fitting holes 42 in the die half and tight-fitting holes 43 in the vertical beams.

A row of such tight-fitting holes 43 is, as seen in FIGS. 3, 4 and 5, formed along the vertical beams 30. The die halves can therefore be positioned in a plurality of positions on the vertical beams.

Each of the tight-fitting pins 41 in the die half 18 is merging into a leader pin 27 and each of the tight-fitting pins 41 in the die half 17 is at the same time functioning as a corresponding leader bush 28.

By at the same time using the tight-fitting pins 41 as corresponding leader pins 27 and leader bushes 28, it is advantageously obtained that the die halves are optimally aligned in relation to both the vertical beams and to each other whereby extraordinary accurate and uniform products repeatedly can be produced.

Each die part 17,18 is clamped on the vertical beams 30 by means of screws 44 fitting into corresponding through holes 45 in the die half 17,18 and into corresponding threaded holes 46 formed in connecting pieces 47. Each connecting piece is formed with a hook 48 which is engaging a longitudinally extending groove 49 in a vertical beam 30. The hook can slide to any position in said groove.

A die half 17,18 is on mounting positioned horizontally on the vertical beam 30 by inserting the tight fitting pins 41 into the tight-fitting holes 42 of the die half 17,18 and also into the tight-fitting holes 43 of the vertical beams 30. The connecting pieces 47 are subsequently positioned by sliding the hooks 47 in the longitudinal grooves 49 of the vertical beams 30 in such way that the screws 44 can be screwed into the threaded holes 46 in the connecting pieces 47 when the tight-fitting pins are inserted into the tight-fitting holes of the die half and the tight-fitting holes of the vertical beams.

By tightening the screws 44 the die is securely and effectively retained on the clamping assemblies and thereby on the platen of the injection-moulding machine.

The positioning of the die halves in relation to each other takes, as previously mentioned, place by means of the leader pins 27 of the die half 18 engaging the leader bushings 28 of the die half 17.

A clearance 45a is formed between each through hole 45 in the die half and the associated screw 44 and also between the hook 48 of the connection piece 47 and the associated longitudinally extending groove 49. Said clearances imply that the screws and the connection pieces do not constitute obstacles against displacing the die half on the vertical beams to the position determined by the leader pins and leader bushes.

Plastic products frequently have a design that requires that one or more cores are inserted in the die during the moulding operation.

FIG. 2 shows a simple product, which has a shape like a cap 23 with an opening 24. The core 25 is, as previously mentioned, inserted into the closed die 17,18 during moulding of the cap. The core 25 is attached to a core bar 26.

As seen in FIG. 3 the core bar 26 is attached to a core retraction assembly 50 consisting of a slide 51 which is slideably mounted on a guideway 52 clamped on a vertical beam 30 by means of screws 53 in threaded holes 54 formed in the vertical beam 30. Tight-fitting pins (not shown), fitting into tight-fitting holes (not shown) in the vertical beam, may be used for positioning the guideway exactly on the beam.

More of such core retraction assemblies may be mounted on the clamping assembly and on both the first- and the second beams of this.

The beam is formed with a number of such threaded holes 54 arranged in such way that the guideway can be mounted in a plurality of positions on the beam.

In FIG. 3, the guideway 52 for retracting the core 25 from the die half 18 is extending perpendicular to the beam. In other examples (not shown) a guideway can form an angle with the beam and the clamping assembly can be mounted with more guideways each having a core slide. Both the vertical and horizontal beam 29,30 can moreover be used for mounting a guideway.

The reciprocating movements of the core slide 51 on the guideway 52 are performed by means of a hydraulic cylinder (not shown). A pump aggregate 55 supplies the hydraulic cylinder with pressured liquid, e.g. oil, circulated through the liquid conduits 56 and 57.

Figure 7:
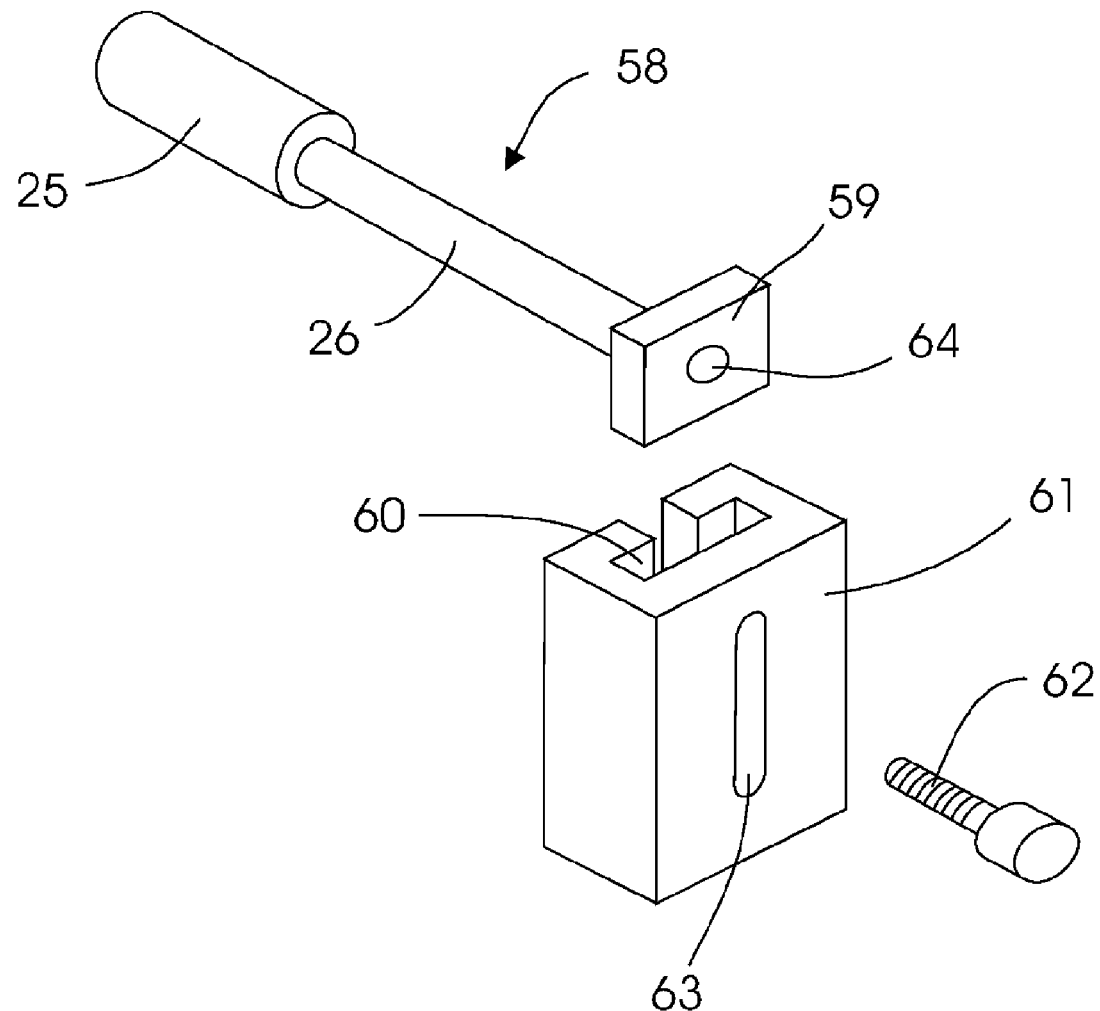
FIG. 7 is an exploded perspective view of a core unit and an adapter for detachably receiving a head of the core unit on a slide of the injection-moulding system shown in FIG. 3.

FIG. 7 shows a core unit 58 consisting of the core 25, the core bar 26 with a head 59, which in this case has a rectangular shape.

The core unit 58 is detachably connected with the core slide 51 by inserting the rectangular head 59 of the unit into a T-slot 60 in an adapter 61 attached to the slide 51. The head is clamped in the T-slot by means of a screw 62 passed through a longish through opening 63 formed in the adapter and screwed into a threaded hole 64 formed in the head 59. The longish shape of the through opening 63 allows the position of the core unit to be adjusted in relation to the core slide 51.

Other means for detachably connecting the core slide 51 with the core unit 58 may be used within the scope of the invention.

The core unit can on replacement of dies easily and quickly be replaced with another core unit while the core retraction assembly is still mounted on the associated beam. Using of core unites according to the invention is therefore very time-saving.

The plastic used for the injection-moulding process is, as previously mentioned, heated for plasticizing the plastic prior to injection. The heat is emitted to the die half, which therefore need to be cooled for cooling the hot plastic down to a temperature at which the plastic becomes solid.

The cooling of the die halves takes place by means of a temperature-adjusting system having a source of coolant 65 which during operation via coolant conduits 66 and 67 is circulated through one or more cooling channels formed in at least one of the die halves.

In the prior art temperature-adjusting systems the cooling conduits are typically connected to and disconnected from the cooling channels every time a die is to be replaced with another die. Changing of dies is therefore time-consuming and expensive, especially because the costly injection moulding machine in the meantime is put out of operation. Moreover, it is nearly impossible to avoid spilling coolant. Both the injection-moulding machine and the die thereby risk being corroded by the coolant, which frequently is water.

These problems of the prior art temperature-adjusting systems are according to the invention remedied by, via the coolant conduits 66 and 67, circulating the coolant in a closed system between the source of coolant 65 and closed cooling tubes which are detachably introduced in the cooling channels.

Figure 8:
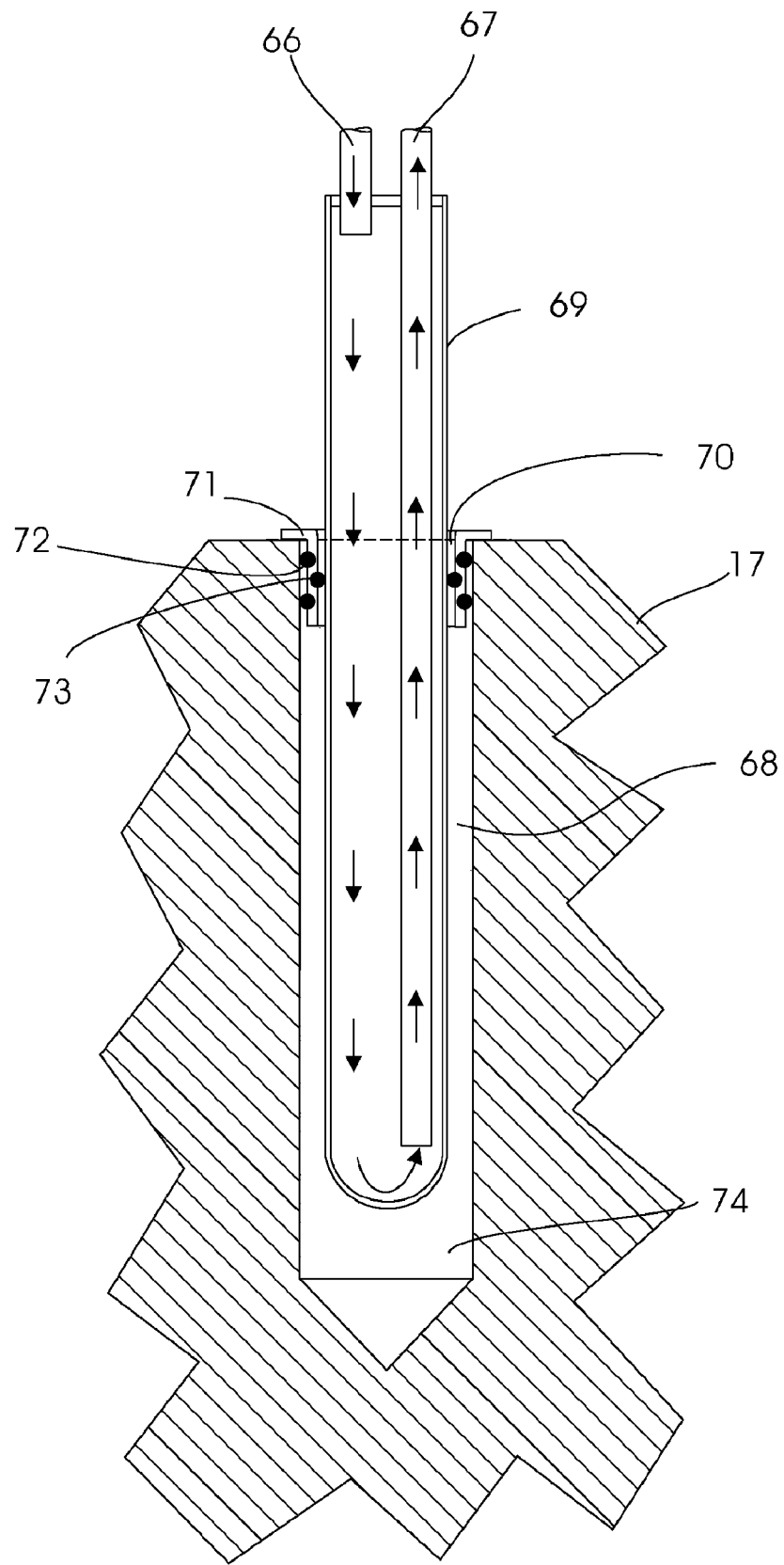
FIG. 8 shows in section a fragment of a die half of the injection-moulding system shown in FIG. 3 with a closed cooling tube.

FIG. 8 shows in section a fragment of the die half 17 in which a cooling channels in form of a blind hole 68 is formed. A closed cooling tube 69 is introduced in the blind hole via an opening 70 in a sleeve 71, which is permanently mounted in the entrance of the blind hole 68.

The sleeve 71 has, on the outside, two O-rings 72 for sealing the sleeve in relation to the wall of the blind hole 68, and on the inside, an O-ring 73 for sealing the sleeve in relation to the closed cooling tube 69.

The coolant conduit 66 is extending a little into the closed cooling tube 69 while the other coolant conduit 67 is extending far into the cooling tube whereby the coolant is forced to flow in the closed cooling tube into the direction indicated by the arrows.

A liquid 74 like e.g. oil is moreover provided in the intermediate space between the wall of the blind hole 68 and the closed cooling tube 69. The liquid ensures an effective exchange of heat between the cooling tube and the wall of the cooling channels.

The cooling tube 69 is, on replacement of dies, removed easily and quickly from the associated channel in the die half being used and inserted into a similar channel in the new die halve. Such replacement takes advantageously place without spilling any coolant owing to the fact that the closed cooling tube is permanently connected to the coolant conduits.

The cooling tube 69 is longer than the blind hole 68 shown in FIG. 8 for being able to be used to longer blind holes in other die halves.

The die is opened after having been cooled down to a temperature at which the plastic has become solid. The moulded product is then ejected by means of an ejector.

An ejector typically comprises an ejector plate and one or more ejector pins extending through the respective die half. Ejection actuation means (not shown) of the injection-moulding machine used move the ejector plate and thereby the ejector pins against the cooled and solidified product that thereby is ejected from the die half.

The ejector pins of the prior art ejectors are mechanically attached to the ejector plates in a time-consuming and expensive way.

Figure 9:
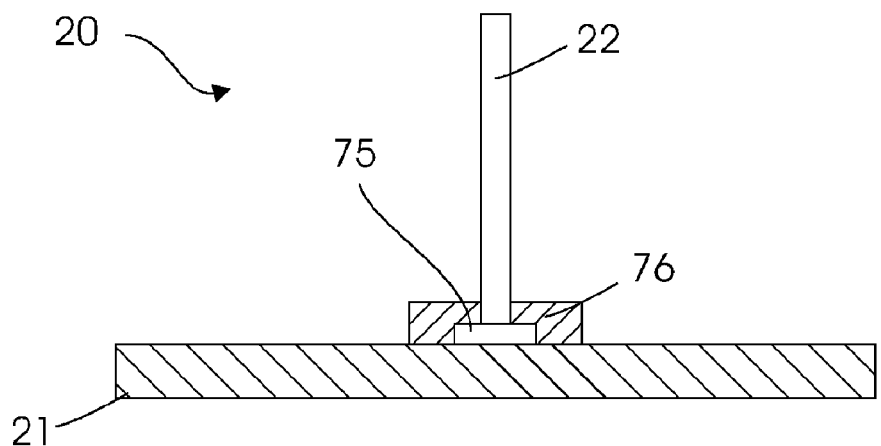
FIG. 9 is a cross-sectional view of an ejector for the injection-moulding system shown in FIG. 3.
Figure 10:
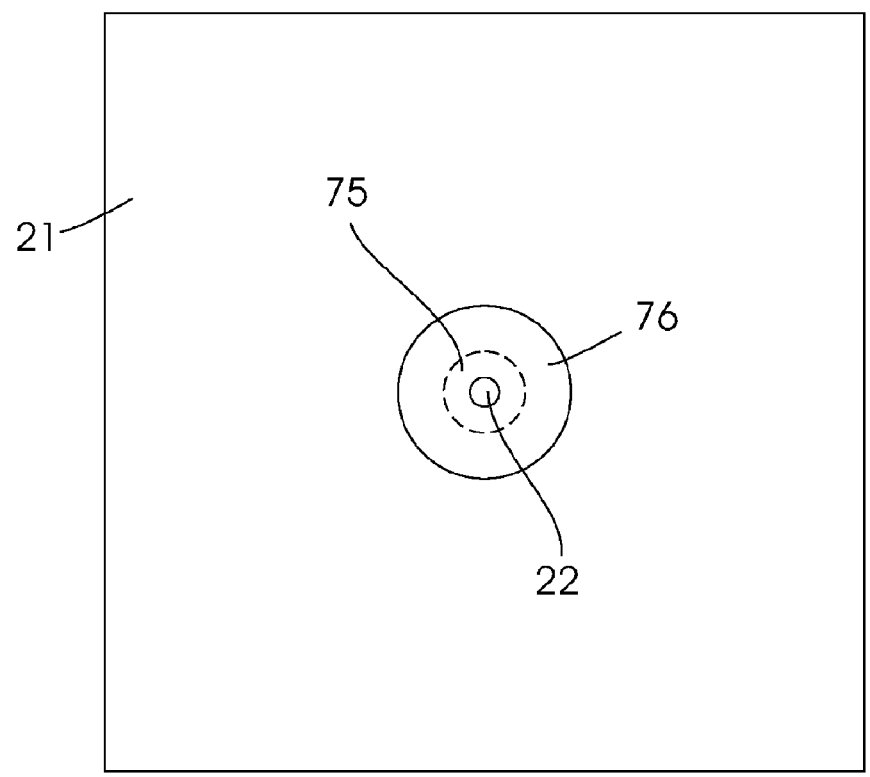
FIG. 10 shows the same, seen from the top.

FIGS. 9 and 10 show an embodiment according to the invention of an ejector 20 adapted for ejecting the simple product 23 shown in FIG. 2. For this purpose, the ejector only needs one ejector pin 22. More ejector pins may be used in other applications.

The ejector pin has a head 75, which is embedded in a two-component adhesive 76, whereby it is obtained that the pin can be securely attached to the ejector plate 21 in an easy and cost-saving way.

The invention is described above on the assumption that the material to be injection-moulded is a plastic. Within the scope of the invention the material can however also be another material, for example a metal.

What is claimed is:

1. A clamping assembly mounted on one of opposed stationary and movable platens of an injection-moulding machine for clamping a die half of a die for injection-moulding a product, wherein the clamping assembly comprises:
    first bar-shaped elements mounted on or integrated with the platen in question and protruding from the platen surface,
    second bar-shaped elements mounted on the first bar-shaped elements and extending crosswise between ends of the first bar-shaped elements, and;
    clamping means for detachably clamping the second bar-shaped elements on both of the first bar-shaped elements in at least two positions,
    wherein the clamping assembly is arranged to adjustably receive die halves of various sizes on the second bar-shaped elements.

2. The clamping assembly according to claim 1, wherein the clamping means comprises a number of through holes in the second elements and a number of threaded holes in the first elements, and that the through holes are positioned opposite each their threaded hole when the second elements are positioned in one of their at least two positions on the first elements.

3. The clamping assembly according to claim 2, wherein the second elements are clamped on the first elements by screws or studs passing through the through holes and screwed into the opposite threaded holes.

4. The clamping assembly according to claim 3, wherein each through hole is formed with a clearance in relation to the associated screw or stud.

5. The clamping assembly according to claim 1, wherein the clamping assembly comprises a number of first tight-fitting holes formed in the first elements and a number of second tight-fitting holes formed in the second elements, and that the first tight-fitting holes are in line with each their second tight-fitting hole when the second elements are placed in one of their at least two positions on the first elements.

6. The clamping assembly according to claim 5, wherein the at least two positions of the second elements on the first elements are fixed by inserting corresponding tight-fitting pins into the first- and second tight-fitting holes, which are in line with each other.

7. The clamping assembly according to claim 1, wherein a number of through holes are formed in the respective die half and that the clamping assembly comprises a number of connecting pieces which each, in a longitudinally sliding way, is engaging one of the second elements and each is formed with at least one threaded hole for receiving a screw which passes through a through hole in the die half.

8. The clamping assembly according to claim 7, wherein the through hole in the die half is formed with a clearance in relation to the associated screw and each connecting piece is formed with a hook which engages a longitudinally extending groove formed in a second element, wherein the groove has a width that is larger than that of the hook and a depth that is larger than the length of the hook.

9. The clamping assembly according to claim 1, wherein the second elements are formed with a number of second tight-fitting holes and that the die half is positioned on the second element by means of second tight-fitting pins which are inserted into at least some of the second tight-fitting holes and are attached to the die half.

10. The clamping assembly according to claim 9, wherein one die half is equipped with leader pins and the other die half is provided with corresponding leader bushes, characterized in that each tight fitting pin is an extension of a leader pin or a leader bush.

11. The clamping assembly according to claim 1, wherein the first and second elements essentially extend in horizontal and vertical directions, respectively, with at least one of the first elements equipped with a longitudinally extending guide rail and at least one of the second elements equipped with at least one slide fitting the guide rail.

12. The clamping assembly according to claim 11, wherein the at least one slide fits the corresponding guide rail with a clearance allowing the second element to be displaced crosswise to the first element.

13. The clamping assembly according to claim 1, wherein the clamping assembly comprises a number of first elements having different lengths, a number of second elements having different lengths, or a number of both the first and second elements having different lengths.

14. The clamping assembly according to claim 1, wherein the die comprises at least one core mounted on a core retraction assembly that is mounted.

15. The clamping assembly according to claim 14, wherein the clamping assembly comprises a number of core retraction assemblies each mounted.

16. The clamping assembly according to claim 14, wherein the core is integrated with a core bar which is adapted to be detachably mounted on the core retraction assembly, with the core bar having a head fitting into a T-slot in the core retraction assembly.

17. A method for producing an injection-moulded product in a die mounted in an injection-moulding machine, which comprises:
    adjusting the clamping assemblies of claim 1 to receive a specific die,
    clamping the die onto the adjusted clamping assemblies,
    injecting material for moulding the product in a heated state into the die,
    cooling the die and thereby the heated material in the die by a temperature-adjusting system comprising a source of coolant and at least one cooling channel formed in the die half, the system comprising at least one closed tube adapted to be detachably introduced into the at least one cooling channel and permanently connected with the source of coolant by a first conduit extending partially into the tube and a second conduit extending further into the tube than the first conduit; and
    ejecting the product by an ejector.

18. An injection-moulding system for an injection-moulding machine, comprising a clamping assembly according to claim 1, a temperature-adjusting system, and an ejector.

19. The injection-moulding system according to claim 18, wherein the temperature-adjusting system comprises a source of coolant and at least one cooling channel formed in the die half, the system comprising at least one closed tube adapted to be detachably introduced into the at least one cooling channel and permanently connected with the source of coolant by a first conduit extending partially into the tube and a second conduit extending further into the tube than the first conduit.

20. The injection-moulding system according to claim 18, wherein the ejector comprises an ejector plate and at least one ejector pin attached to the ejector plate, wherein the at least one ejector pin is attached to the ejector plate by an adhesive.

21. The injection-moulding system according to claim 18, which further comprises a temperature-adjusting system for adjusting the temperature of a die half clamped on opposed stationary and movable platens of an injection-moulding machine which comprises a source of coolant and at least one cooling channel formed in the die half, the system comprising at least one closed tube adapted to be detachably introduced into the at least one cooling channel and permanently connected with the source of coolant by a first conduit extending partially into the tube and a second conduit extending further into the tube than the first conduit.

22. The injection-moulding system according to claim 21, which further comprises a sleeve which is permanently mounted on the at least one cooling channel and which has at least one seal for sealing the sleeve in relation to the at least one cooling channel and at least one other seal for sealing the sleeve in relation to the at least one closed tube after this tube has passed into the at least one cooling channel through the sleeve.

23. The injection-moulding system according to claim 21, wherein the at least one cooling channel has a blind hole and that a liquid is provided in the space between the wall of the blind hole and the at least one closed tube introduced into the blind hole.

* * * * *

UNITED STATES PATENT AND TRADEMARK OFFICE
CERTIFICATE OF CORRECTION

PATENT NO. : 7,829,007 B2
APPLICATION NO. : 12/375637
DATED : November 9, 2010
INVENTOR(S) : Axelsson It is certified that error appears in the above-identified patent and that said Letters Patent is hereby corrected as shown below:

Title Page:
Item (56) References Cited, FOREIGN PATENT DOCUMENTS, change "JP   2003-337370 A" to -- JP   2003-71898 A --.

Column 13:
Line 20, claim 1 change "and;" to -- and --.

Signed and Sealed this

Twenty-first Day of December, 2010

David J. Kappos
*Director of the United States Patent and Trademark Office*